July 5, 1938.  A. W. WHISTLECROFT  2,122,902
EARTH SWITCH ARRANGEMENT
Filed May 23, 1936
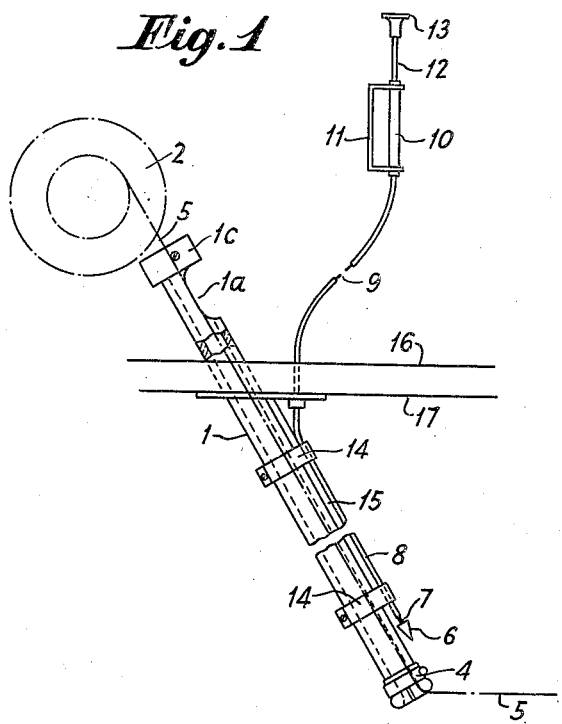
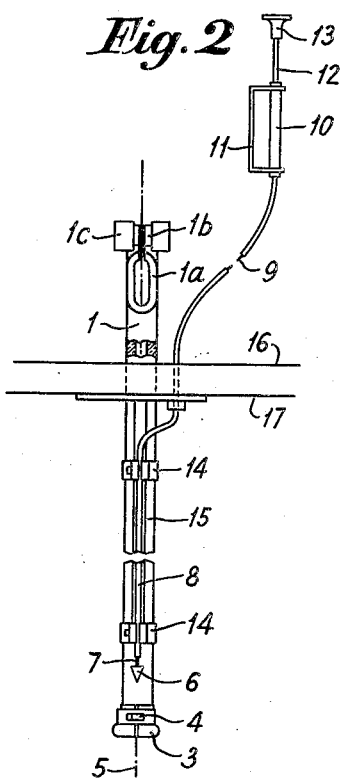
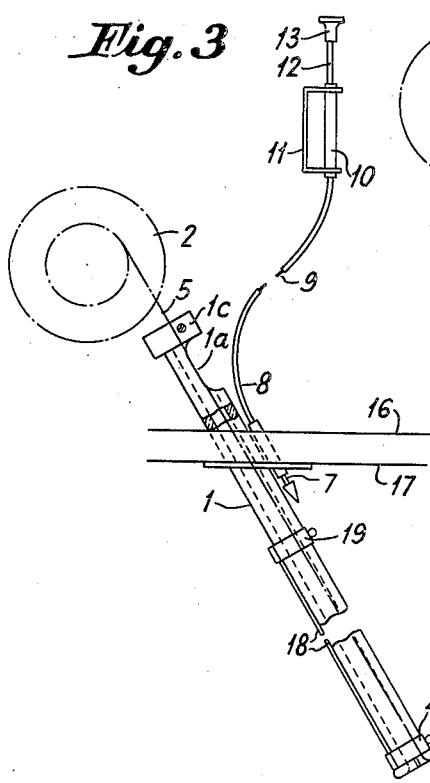
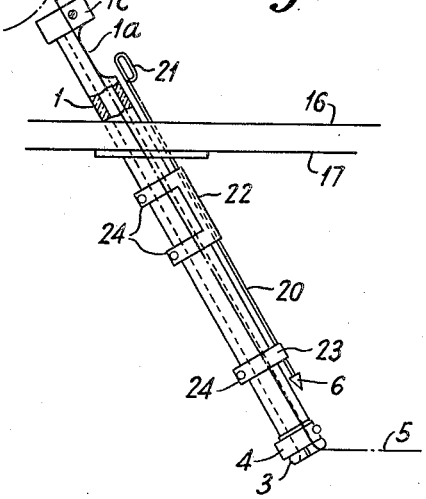
INVENTOR
ARTHUR WILLIAM WHISTLECROFT
BY
ATTORNEY Patented July 5, 1938

2,122,902

UNITED STATES PATENT OFFICE 2,122,902

EARTH SWITCH ARRANGEMENT

Arthur William Whistlecroft, Croydon, England, assignor to Radio Corporation of America, a corporation of Delaware Application May 23, 1936, Serial No. 81,377
In Great Britain May 24, 1935

7 Claims. (Cl. 250—33)

This invention relates to earthing switch arrangements and, though not exclusively limited to its application thereto, is primarily intended for use in connection with aircraft to enable an aircraft aerial to be earthed—that is to say to be connected to the "frame" of the aircraft when required.

The object of the invention is to provide an improved earthing switch arrangement which is of simple and strong construction; which can be utilized to earth an aerial or similar circuit at a point comparatively remote from the operator; and which, when applied to aircraft, enables the aerial to be earthed outside the aircraft fuselage—a point which is of considerable advantage especially when flying through a thunderstorm area to prevent the accumulation of a static charge on the aerial. Maximum protection of an aircraft from a thunderstorm is obtained only when all metallic members are of substantially the same electrical potential, as any difference in the potenial of metallic members allows a static charge to be built up, and the accumulation of this charge is always a source of danger.

According to this invention, an earthing switch arrangement comprises a contacting member which is mounted at one end of the movable member of a remote control device, an "earthed" tape or other conductor in conductive connection with said contacting member, and an operating handle at the other end of the movable member of said remote control device whereby the said contacting member may be moved into a position in which it contacts with the point at which "earth" is to be applied.

The remote control device may consist, for example, of a rigid rod or a flexible wire fitted into a tubular metal casing which may or may not be flexible, said flexible wire (if employed) being of sufficient stiffness to be pushed or pulled longitudinally in said casing and the earthed tape or other conductor may be connected to said tubular casing (e. g. by means of a clip) so that the earth connection thus includes the said contacting member, a portion of the movable member of the remote control device and the "earthed" tape or other conductor. The operating handle may be insulated or earthed as described.

The invention is illustrated in the accompanying drawing, in which:

Figs. 1 and 2 are part sectional mutually perpendicular views of one embodiment, and Figs. 3 and 4 show modifications.

In one way of carrying out this invention as applied to the fair lead or the guide tube portion of an aircraft aerial arrangement, there is provided for the fair lead, an insulating tube 1 of more or less usual construction, cut away at 1a and provided with the usual slotted metal end member 1b protected by an insulating member 1c. The lower end of the insulating tube is fitted with a tubular split metal cap 3 this cap being held in the desired position longitudinally of the insulating tube by means of a clamp or clip 4 which surrounds a split portion of the said cap and which is adapted when tightened to tighten the said split cap down upon the insulating tube. The aerial 5 which is adapted to be wound or unwound as required from a reel 2, passes down the fair lead and makes contact with the tubular metal cap 3. Earthing of the aerial is effected when required by making contact with the clip 4 which clamps the split cap 3 to the insulating tube 1 and such contact is made by means of an approximately conical brass contacting member 6 which is attached to the end of a metal rod 7 which can be moved to project from the flexible casing 8 of a remote control device as illustrated. Push and pull motion is transmitted from a remote point to the metal rod 7 and therefore to the contacting member 6 by means of the usual flexible inner wire or cable 9 inside the casing 8. The casing 8 and inner wire or cable 9 are made of such length as to extend to the desired control point where the casing 8 is attached to a suitable tubular member 10 adapted to be fixed by means of a bracket 11 in any convenient way inside the cockpit of the aircraft. The inner cable 9 terminates in a rod 12 which passes through the tube 10 and an operating button 13 is fitted at the end of the said rod 12.

The flexible casing 8 is attached to the insulating tube 1 or fair lead over a desired portion of the length thereof by means of clamps or clips 14, and one of these said clamps or clips also holds one end of a copper tape or other earthing conductor 15 which is "earthed" to the "frame" of the aircraft outside the fuselage. The floor of the fuselage is represented at 16 and the outer skin of the machine at 17.

It will be seen that with the above described arrangement, when it is desired to earth the aerial 5, the control push button 13 is pressed and a push movement is transmitted through the inner cable 9 to the conical contacting member 6 which accordingly moves longitudinally of the insulating tube 1 and earths the aerial 5 by contacting with the clamp member 4 which clips the split cap 3 upon one end of the said insulating tube or fair lead 1.

It will be seen that with this arrangement, the construction is such that the length of the fair lead may be adjusted to suit the dimensions of the aircraft in which it is to be installed, while it will be noted that the aerial is earthed outside the fuselage of the aircraft.

It is not necessary that the earthing contact be made at the end of the fair lead where the aerial leaves it, for in some cases it may be desirable to make the earthing contact near the point where the fair lead passes through the fuselage. In such cases, a conductor 18 may, as shown in Fig. 3, be carried up the outside of the fair lead, said conductor connecting the end cap 3 and clip 4 to a suitable intermediate fitting 19 to which earthing connection is made, when desired, by the contacting member 6. In such a construction, ample clearance and leakage surface must, of course, be left between this fitting 19 (which is "live" during wireless transmission) and the "earth" on the fuselage.

Again it is not necessary in all cases that the remote control device be of a flexible nature and in Fig. 4 is shown an arrangement like that of Fig. 3 except that a nonflexible remote control device, operable from a point near the top of the fair lead, is used. This remote control device consists of a rod 20, carrying the contact 6 at one end and provided with or formed as a handle 21 at the other. The rod 20 can be moved longitudinally in guides 22, 23 adapted to be attached to any convenient fixed suport, e. g. as shown in Fig. 4, by means of clip extensions 24 clamped about the body of the fair lead.

Arrangements as shown in Figs. 3 and 4 where the earthing contact is made at a fitting (19) connected by a strip (18) to the cap (3) and situated near the fuselage, present a fairly important advantage where medium power transmitters are in question by reason of the fact that the said strip is, during transmission, at the same potential as the aerial inside the fair lead. This means that there is no tendency for a brush discharge to take place during transmission from the aerial due to the presence of the strip and, of course, there would be such a tendency if the strip were earthed. Such brush discharges would be likely in time to carbonize the inner tubular surface of the fair lead.

Although in the illustrated embodiments earthing is effected by pushing the control knob or handle to impart a thrust action to the movable member of the remote control device, obviously matters could be so arranged that earthing was accomplished by pulling the control knob or handle to impart a tension action to said movable member.

The invention is not limited to the particular application above described, e. g. it may be employed to provide an earthing switch for flying boat hull insulators.

What is claimed is:

1. An antenna grounding switch arrangement comprising a fixed contact member located adjacent to and electrically connected with said antenna, a movable switch contacting member located near said fixed contact, and means for remotely operating said movable switch contacting member to ground said antenna when not in use.

2. An antenna grounding switch arrangement for grounding an aircraft antenna comprising a guide member passing through the body of said aircraft, a fixed switch contact member located at one end of said guide member and electrically connected with said antenna, a movable switch contacting member located near said fixed contact, and means for remotely operating said movable switch contacting member from within said aircraft to ground said antenna when not in use.

3. An arrangement according to claim 2 wherein the fixed contact member is carried by the guide member at an intermediate point along the length thereof, and is connected by a conductor to a conductive member connected to said antenna.

4. An antenna grounding switch arrangement for grounding an aircraft antenna comprising a guide member passing through the body of said aircraft, a fixed switch contact member located at one end of said guide member and electrically connected with said antenna, a movable switch contacting member in the form of a rigid rod located near said fixed contact, and means for remotely operating said movable switch contacting member from within said aircraft to ground said antenna when not in use.

5. An antenna grounding switch arrangement for grounding an aircraft antenna comprising a guide member passing through the body of said aircraft, a fixed switch contact member located at one end of said guide member and electrically connected with said antenna, a movable switch contacting member comprising a flexible casing having a flexible member located within said casing, said movable switch contacting member being located near said fixed contact, and means for remotely operating said movable switch contacting member from within said aircraft to ground said antenna when not in use.

6. An antenna grounding switch arrangement for grounding an aircraft antenna comprising an insulating tube member passing through the body of said aircraft, a fixed switch contact member located at one end of said insulating tube member and electrically connected with said antenna, a movable switch contacting member in the form of a rigid rod located near said fixed contact, and means for operating said movable switch contacting member to ground said antenna when not in use.

7. An antenna grounding switch arrangement for grounding an aircraft antenna comprising an insulating tube member passing through the body of said aircraft, a fixed switch contact member in the form of a metallic clip located at one end of said insulating tube member and electrically connected with said antenna, a movable switch contacting member in the form of a rigid rod having a conical contacting member and located near said fixed contact, and means for operating said movable switch contacting member to ground said antenna when not in use.

ARTHUR WILLIAM WHISTLECROFT.